United States Patent [19]

Mizuno

[11] Patent Number: 4,952,952
[45] Date of Patent: Aug. 28, 1990

[54] METHOD AND APPARATUS FOR VIDEO SIGNAL TRANSMISSION USING MODULATION

[75] Inventor: Sakuyuki Mizuno, Kunitachi, Japan

[73] Assignee: Kabushiki Kaisha Toshiba, Kawasaki, Japan

[21] Appl. No.: 353,617

[22] Filed: May 18, 1989

[30] Foreign Application Priority Data

May 23, 1988 [JP] Japan .................. 63-124023

[51] Int. Cl.⁵ .................. H04N 5/04; H04N 7/12; H04N 7/04; H04N 11/06
[52] U.S. Cl. .................. 358/148; 358/138; 358/141; 358/12
[58] Field of Search .................. 358/138, 186, 141, 12, 358/23, 148

[56] References Cited

U.S. PATENT DOCUMENTS

| | | | |
|---|---|---|---|
| 4,335,393 | 6/1982 | Pearson | 358/12 |
| 4,661,839 | 4/1987 | Plantholt et al. | 358/141 |
| 4,774,575 | 9/1988 | Takayama | 358/138 |
| 4,831,441 | 5/1989 | Ando | 358/141 |

Primary Examiner—John K. Peng
Attorney, Agent, or Firm—Foley & Lardner, Schwartz, Jeffery, Schwaab, Mack, Blumenthal & Evans

[57] ABSTRACT

A method of video signal transmission using modulation, capable of, and apparatus for, facilitating an accurate image reproduction possible in an inexpensive manner by eliminating mis-sampling problem. The phase relationship between the horizontal synchronization signal and the sampling clock signal is controlled such that the phase relationship will be alternated with a completely opposite one differing by 180° successively.

8 Claims, 6 Drawing Sheets

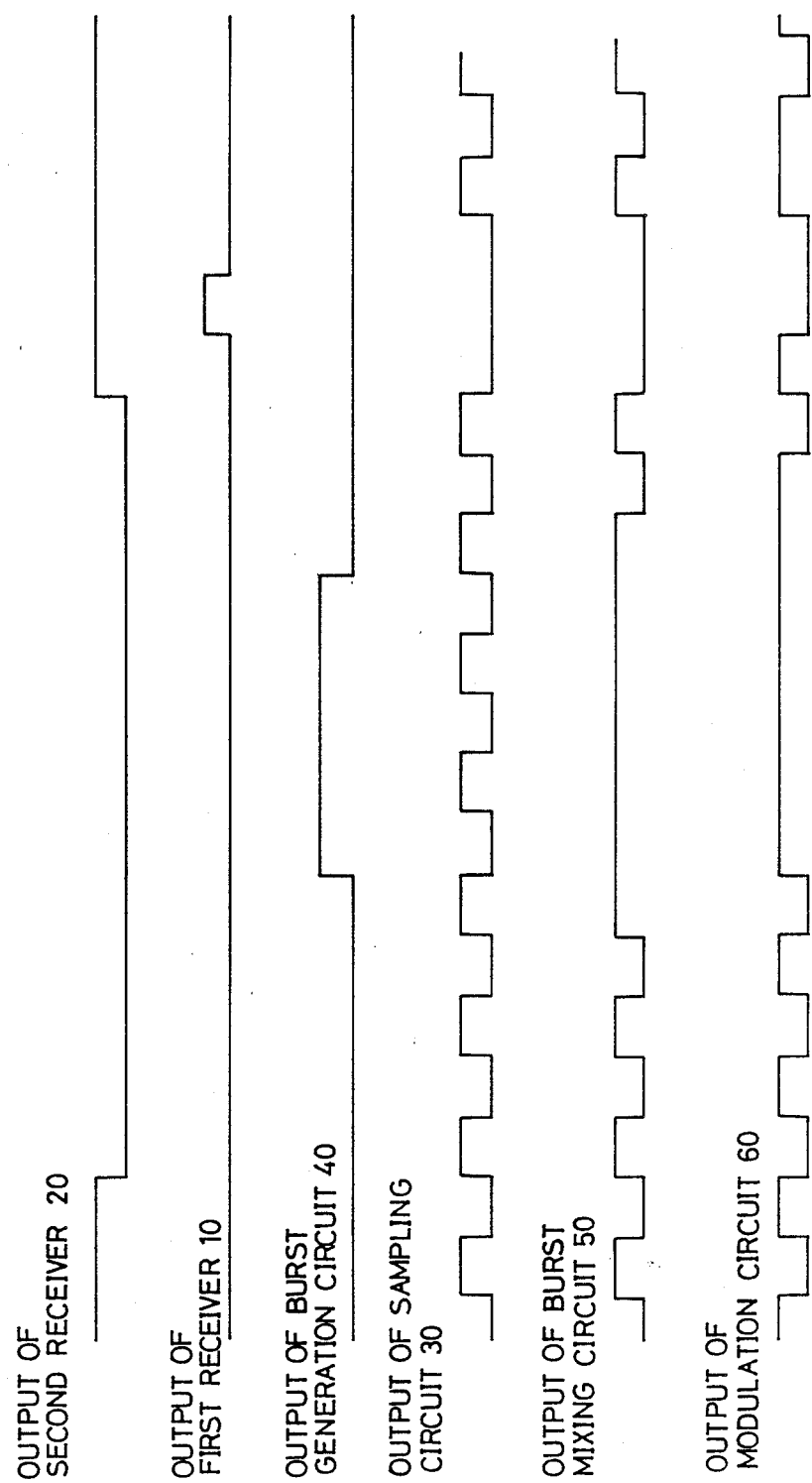

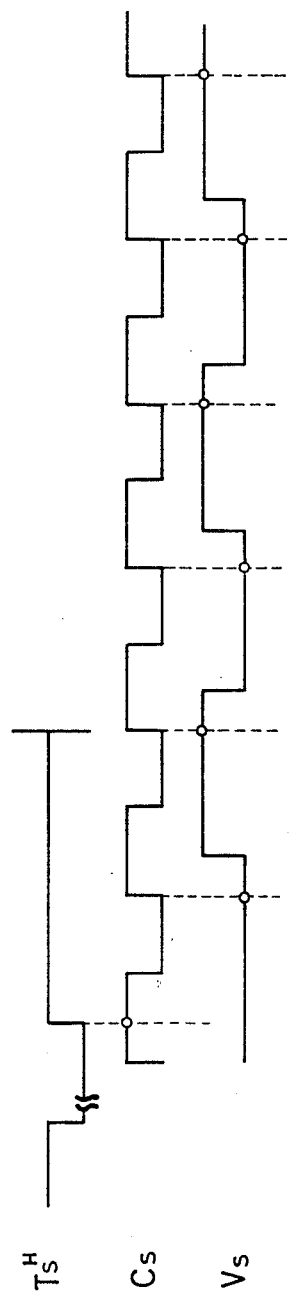
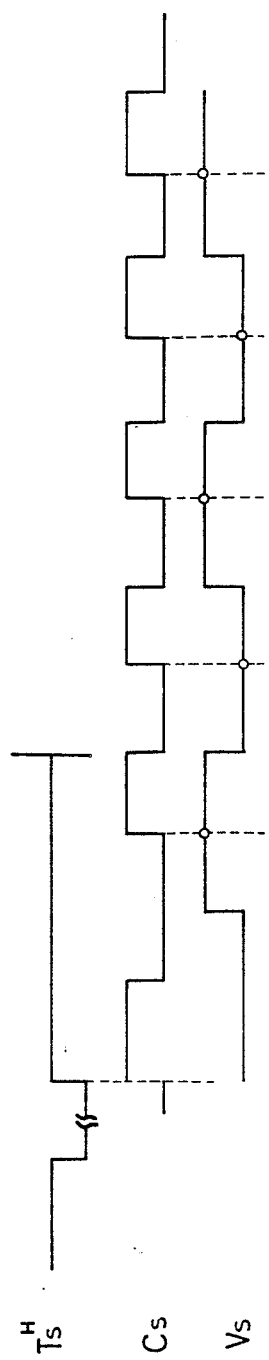
FIG.6(A)
FIG.6(B)

METHOD AND APPARATUS FOR VIDEO SIGNAL TRANSMISSION USING MODULATION

BACKGROUND OF THE INVENTION

1. Field of the Invention

The present invention relates to a method and apparatus for transmitting visual information in the form of video signals.

2. Description of the Background Art

A transmission of visual information in terms of video signals such as that from a controller to a distant CRT display unit in a process control system is carried out either by transmitting the video signals from the controller through amplifiers and wave-shaping circuits without modulation, or else by transmitting the video signal with modulation and then demodulating back for display.

In the latter using modulation, the video signals from the controller are sampled at a given sampling frequency, and then the sampled video signals are modulated before further transmission to the CRT display unit.

However, in such a conventional video signal transmission there is a problem of mis-sampling occurring when the difference between a frequency of the incoming video signals and that of the sampling is present, which results in an inaccurate image reproduction at the CRT display unit.

Although this problem of mis-sampling can be ameliorated by providing a higher sampling frequency with respect to an video signal resolution, realization of such a higher sampling frequency calls for an expensive devices using high speed circuit elements, so that it has not been possible to solve the problem at a more practical economic level.

SUMMARY OF THE INVENTION

It is therefore an object of the present invention to provide a method and apparatus for video signal transmission using modulation, capable of facilitating an accurate image reproduction possible in an inexpensive manner by eliminating mis-sampling.

According to one aspect of the present invention there is provided an apparatus for transmitting video signals accompanied by horizontal and vertical synchronization signals using modulation, comprising: sampling means for sampling incoming video signals; oscillator means for providing sampling clock signals; modulation means for modulating sampled video signals at times given by the sampling clock signals; means for controlling the phase relationship between the horizontal synchronization signal and the sampling clock signals; and transmitter means for transmitting the modulated video signals from the modulation means.

According to another aspect of the present invention there is provided a method of transmitting video signals accompanied by horizontal and vertical synchronization signals using modulation, comprising the steps of: sampling incoming video signals; providing sampling clock signals; modulating sampled video signals at time given by the sampling clock signals; controlling the phase relationship between the horizontal synchronization signal and the sampling clock signals such that the phase relationship will be alternated with completely oppositve signals differing by 180° successively; and transmitting the modulated video signals.

Other features and advantages of the present invention will become apparent from the following description taken in conjunction with the accompanying drawings.

BRIEF DESCRIPTION OF THE DRAWINGS

FIG. 5 is a timing chart for outputs of a first receiver, a second receiver, a sampling circuit, a burst generation circuit, a burst mixing circuit, and a modulation circuit in the apparatus of FIG. 1.

FIGS. 6(A) and (B) are timing charts of the horizontal synchronization signal, a sampling clock signal, and the video signal in the apparatus of FIG. 1 for explaining effects of the operation of this apparatus in two distinct circumstances.

DETAILED DESCRIPTION OF THE PREFERRED EMBODIMENTS

Figure 1:
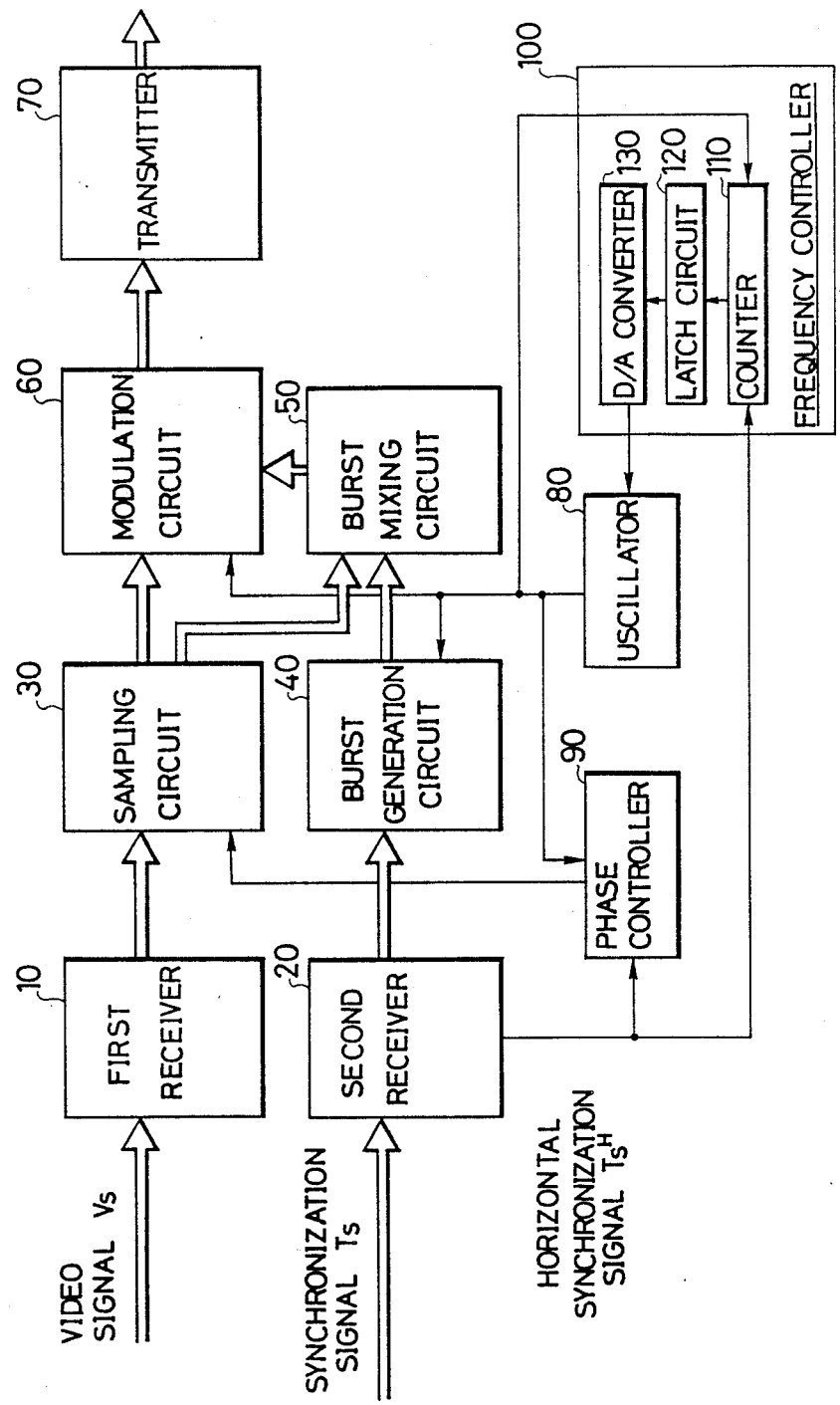
FIG. 1 is a block diagram of one embodiment of an video signal transmission apparatus according to the present invention.

Referring now to FIG. 1, there is shown one embodiment of an video signal transmission apparatus according to the present invention.

This video signal transmission apparatus comprises a first receiver 10 for receiving video signals Vs, a second receiver 20 for receiving synchronization signals Ts, a sampling circuit 30 for sampling the video signals Vs received by the first receiver 10, a burst generation circuit 40 for generating burst signals with respect to the synchronization signal Ts received by the second receiver 20, a burst mixing circuit 50 for mixing sampled video signals from the sampling circuit 30 and the burst signals from the burst generation circuit 40, a modulation circuit 60 for modulating the sampled video signals with burst mixed signals from the burst mixing circuit 50, and a transmitter 70 for transmitting modulated signals from the modulation circuit 60 to a demodulation circuit of a distant receiver unit.

In addition, this video signal transmission apparatus further comprises an oscillator 80 for providing sampling clock signals to the burst generation circuit 50 and the modulation circuit 60, a phase controller 90 for controllably providing sampling phase to the sampling circuit 30 by comparing phases of horizontal synchronization signal received by the second receiver 20 and the sampling clock signals from the oscillator 80, and a frequency controller 100 for controlling frequency of the oscillator 80 by comparing frequencies of the horizontal synchronization signal received by the second receiver 20 and the sampling clock signals from the oscillator 80.

The frequency controller 100 further comprises a counter 110 for counting the sampling clock signals from the oscillator 80 which can be reset to a prescribed initial value by the horizontal synchronization signal from the second receiver 20, a latch circuit 120 for holding output of the counter 110, and a D/A converter 130 for providing output of the latch circuit 120 to the oscillator 80 in analog.

The phase controller 90 can be an ordinary device capable of comparing phases of different signals generally known by those skilled in the art.

Figure 2:
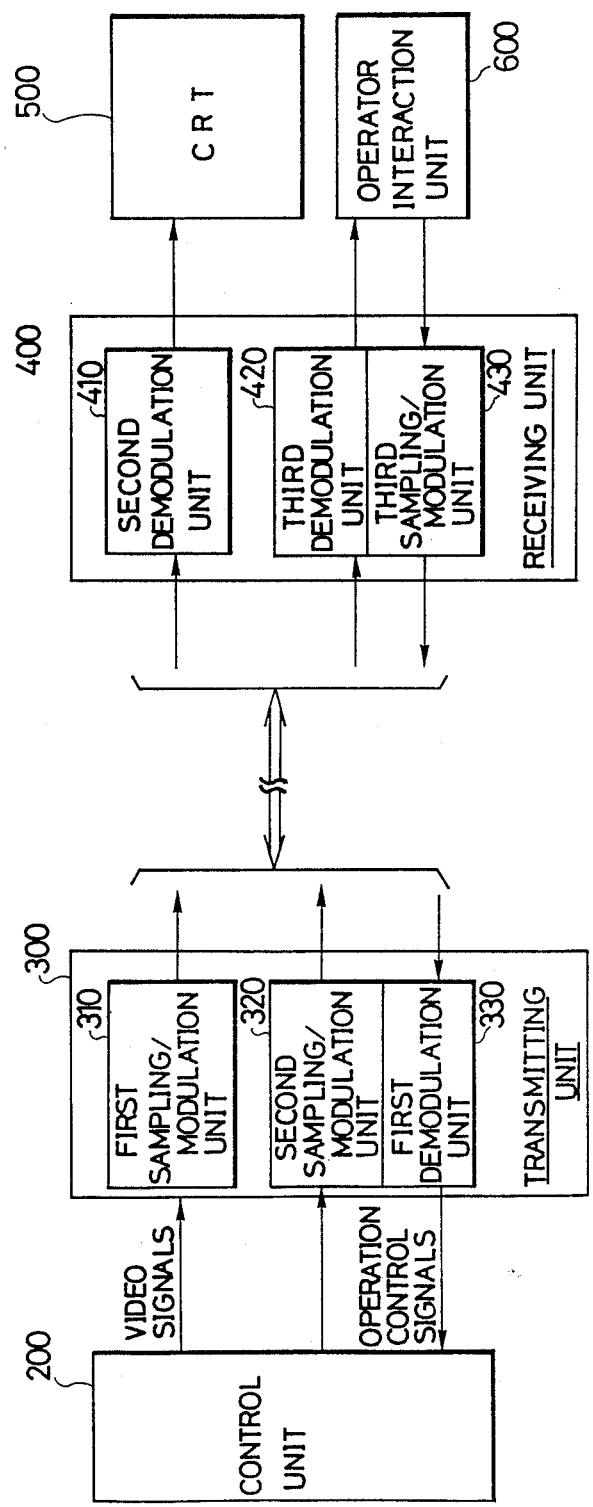
FIG. 2 is a schematic block diagram of an video signal transmission system in which the apparatus of FIG. 1 is to be incorporated.

This video signal transmission apparatus can be incorporated into a video signal transmission system shown in FIG. 2. Here, the video signal transmission apparatus of FIG. 1 is to be utilized as a first sampling/modulation unit 310 of a transmitting unit 300 which transmits video signals from a control unit 200 to a distant receiving unit 400 associated with CRT 500. Such a video signal transmission system further includes a second sampling-/modulation unit 320 and a first demodulation unit 330 for mediating exchanges of operation control signals between the control unit 200 and an operator interaction unit 600 associated with the CRT 500, on a side of the transmitting unit 300, and a second demodulation unit 410 for mediating the transmission of the video signal from the first sampling/modulation unit 310 to the CRT 500 and a third demodulation unit 420 and a third sampling/modulation unit 430 for mediating exchanges of operation control signals between the control unit 200 and the operator interaction unit 600, on a side of the receiving unit 400.

Figure 3:
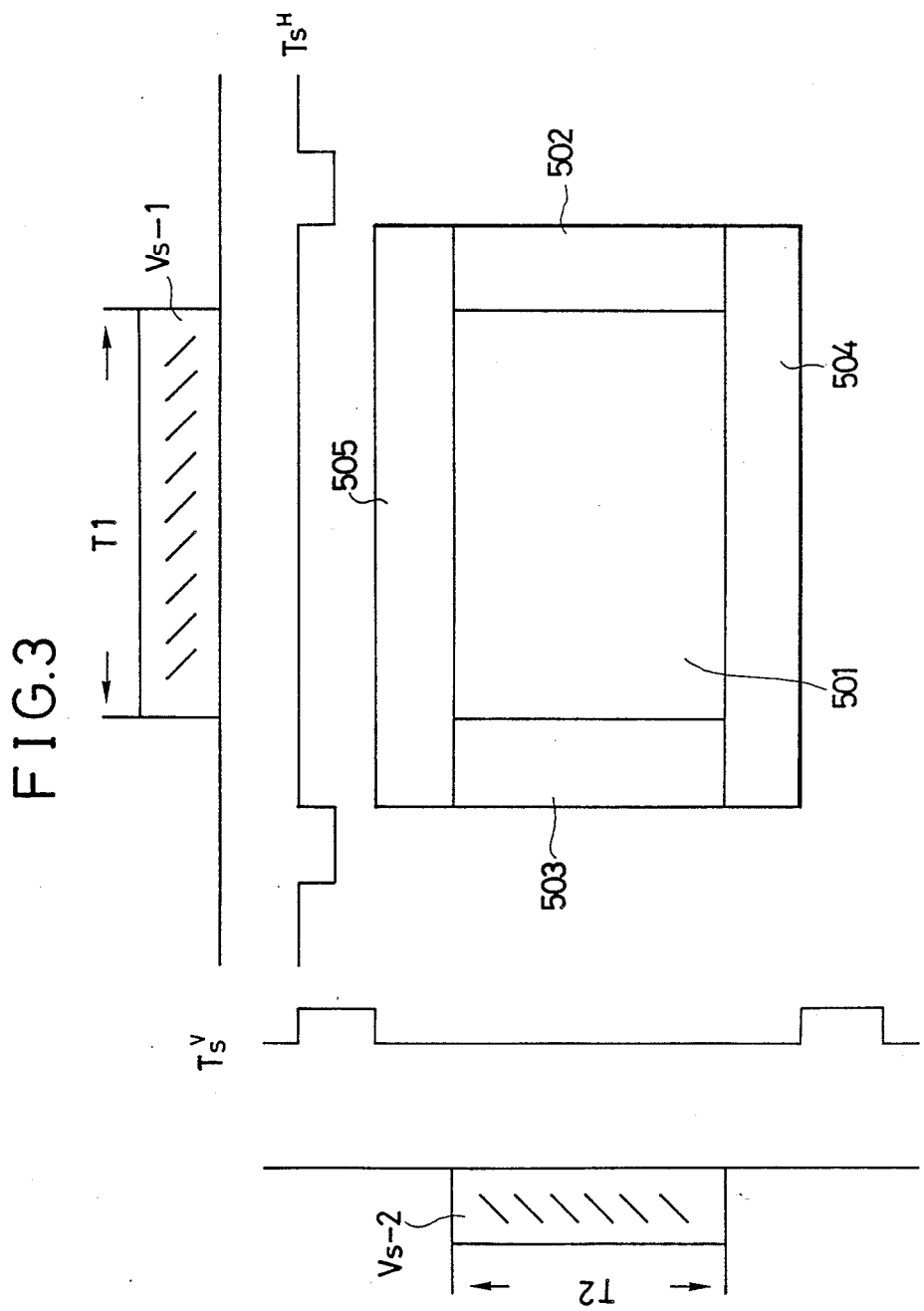
FIG. 3 is a diagrammatic illustration of a viewing field to be constructed from the video signal in the apparatus of FIG. 1, for explaining operation of the apparatus of FIG. 1.
Figure 4A:
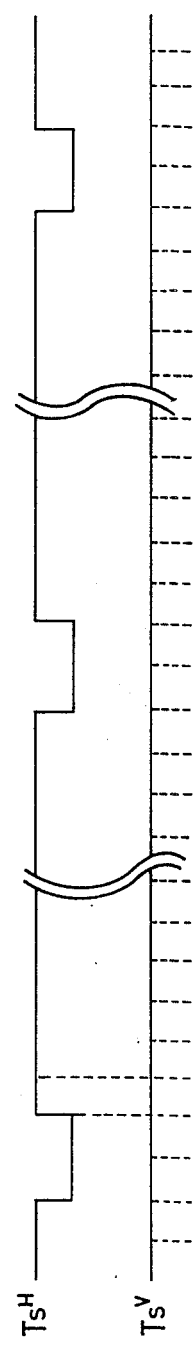
FIGS. 4(A) and (B) are timing charts of horizontal and vertical synchronization signals and the video signals in the apparatus of FIG. 1.
Figure 4B:
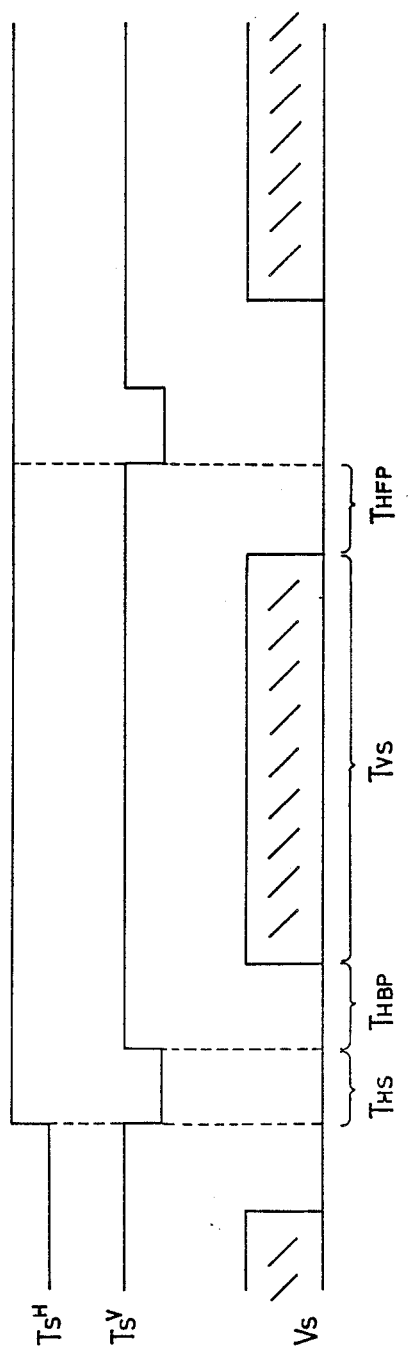

Referring now to FIGS. 3 to 5, the operation of the video signal transmission apparatus of FIG. 1 will be explained.

In general, a view field for the CRT 500 comprises a display area 501, a horizontal front porch 502, a horizontal back porch 503, a vertical front porch 504, and a vertical back porch 505, as shown in FIG. 3. Such a view field is given by a horizontal synchronization signal $Ts^H$, a vertical synchronization signal $Ts^V$, and video signals Vs-1 and Vs-2. The video signals Vs-1 and Vs-2 are transmitted during time periods T1 and T2, respectively.

Timing relationships among the horizontal synchronization signal $Ts^H$, the vertical synchronization signal $Ts^V$, and the video signals Vs-1 and Vs-2. The video signals Vs-1 and Vs-2 are shown in more detail in FIGS. 4(A) and 4(B). As can be seen from FIG. 4(A), within one period of the vertical synchronization signal $Ts^V$, there are as many horizontal synchronization signals $Ts^H$ as there are horizontal scanning lines. Focusing on one period of the horizontal synchronization signals $Ts^H$ as in FIG. 4(B), there is a horizontal synchronization peroid $T_{HS}$, followed by a horizontal back porch period $T_{HBP}$, followed by a video signal period $T_{VS}$ in which the video signal Vs for one scanning line is transmitted, followed by a horizontal front porch period $T_{HFP}$, within each period of the horizontal synchronization signals $Ts^H$.

Such video signals Vs and synchronization signals Ts are fed into the first receiver 10 and the second receiver 20, respectively, and are subsequently given to the sampling circuit 30 and the burst generation circuit 40, respectively.

The sampling circuit 30 samples the video signals Vs received by the first receiver 10 according to the sampling phase given by the phase controller 90, and feeds the sampled video signals to the burst mixing circuit 50 as well as to the modulation circuit 60.

The burst generation circuit 40 generates the burst signals with respect to the synchronization signal Ts received by the second receiver 20 at the timing given by the sampling clock signals Cs from the oscillator 80, and feeds the generated burst signals to the burst mixing circuit 50.

The burst mixing circuit 50 mixes the sampled video signals from the sampling circuit 30 and the burst signals from the burst generation circuit 40, and feeds the resulting burst mixed signals to the modulation circuit 60.

The modulation circuit 60 modulates the sampled video signals with burst mixed signals from the burst mixing circuit 50 at the timing given by the sampling clock signals Cs from the oscillator 80, and feeds the modulated signals to the transmitter 70.

The timing relationships among outputs of the first receiver 10, the second receiver 20, the sampling circuit 30, the burst generation circuit 40, the burst mixing circuit 50, and the modulation circuit 60 are shown in FIG. 5, in conjunction with which the foregoing description of these circuit elements can more clearly be understood.

The transmitter 70 transmits the modulated signals from the modulation circuit 60 to a demodulation circuit of a distant receiver unit.

The oscillator 80 provides the sampling clock signals Cs to the burst generation circuit 40 and the modulation circuit 60.

The phase controller 90 controllably provides the sampling phase to the sampling circuit 30 by comparing phases of horizontal synchronization signal $Ts^H$ received by the second receiver 20 and the sampling clock signals Cs from the oscillator 80.

The frequency controller 100 controls frequency of the oscillator 80 by comparing frequencies of the horizontal synchronization signal $Ts^H$ received by the second receiver 20 and the sampling clock signals Cs from the oscillator 80.

This frequency control in more detail is done as follows. The counter 110 is reset to the prescribed initial value when one horizontal synchronization signal $Ts^H$ comes in, and starts counting the sampling clock signals Cs from the oscillator 80, and feeds the result of counting to the latch circuit 120 when next horizontal synchronization signal $Ts^H$ comes in while being reset to the prescribed initial value again. The latch circuit 120 then feeds this result of counting from the counter 110 to the D/A converter 130 after some holding period. The D/A converter 130 then converts this result of counting from the counter 110 which has been held by the latch circuit 120 into analog signals and feeds these analog signals to the oscillator 80 as new frequency of the sampling clock signals Cs. Thus, when the frequency of the sampling clock signals Cs tends to increase, the frequency controller 100 works to reduce the frequency of the sampling clock signals Cs by giving a new low frequency, whereas when the frequency of the sampling clock signals Cs tends to decrease, the frequency controller 100 works to increase the frequency of the sampling clock signals Cs by providing a new frequency which is higher than before.

Because of such frequency control by frequency controller 100 performed along with the phase control of the sampling phase by the phase controller 90, it is possible in this video signal transmission apparatus of FIG. 1 to manipulate the phase relationship between the horizontal synchronization signal $Ts^H$ and the sampling clock signal Cs. More specifically, as shown in FIGS. 6(A) and 6(B), the phase relationship between the horizontal synchronization signal $Ts^H$ and the sampling clock signals Cs can be altered such that this phase relationship will be shifted into a completely opposite one differing by 180° at successive periods of the horizontal synchronization signal $Ts^H$. In FIGS. 6(A) and 6(B), the small circles appearing on the video signal Vs indicate the timings for sampling.

As a result, when the phase displacement of a certain kind occurs successively at a same horizontal position on neighboring scanning lines which causes a locally distorted image in a conventional apparatus, no such local distortion of the image is caused at visually susceptible level in this embodiment, as the alternation of the phase relationship between the horizontal synchronization signal $Ts^H$ and the sampling clock signals Cs takes place such that this phase relationship will be shifted to a completely opposite one differing by 180° at successive circumstances, so that effects of alternating phase relationships at successive scannings appear to cancel each other at the visually susceptible level.

Thus, according to this embodiment, it is possible to provide a method and apparatus for video signal transmission using modulation, capable of facilitating an accurate image reproduction possible in an inexpensive manner by eliminating mis-sampling problem.

It is to be noted that many modifications and variations of the above embodiment can be made without departing from the novel and advantageous features of the present invention. Accordingly, all such modifications and variations are intended to be included within the scope of the appended scope.

What is claimed is:

1. An apparatus for transmitting video signals accompanied by horizontal and vertical synchronization signals using modulation, comprising:
    sampling means for sampling incoming video signals;
    oscillator means for providing sampling clock signals;
    modulation means for modulating sampled video signals at timings given by the sampling clock signals;
    means for controlling the phase relationship between the horizontal synchronization signal and the sampling clock signal; and
    transmitter means for transmitting the modulated video signals from the modulation means.

2. The apparatus of claim 1, wherein the controlling means controls the phase relationship between the horizontal synchronization signal and the sampling clock signals such that the phase relationship will be alternated with a completely opposite one differing by 180° successively.

3. The apparatus of claim 2, wherein the controlling means further comprises:
    phase controller means for controllably providing a sampling phase to the sampling means by comparing phases of the horizontal synchronization signal and the sampling clock signals; and
    frequency controller means for controlling frequency of the oscillator means by comparing frequencies of the horizontal synchronization signal and the sampling clock signals.

4. The apparatus of claim 3, wherein the frequency controller means includes:
    counter means for counting the sampling clock signals, which can be reset to a prescribed initial value and produces the result of counting when one horizontal synchronization signal is given;
    latch means for holding the result of counting from the counter means; and
    D/A converter means for converting the result of counting held by the latch means into analog signals, and feeds the analog signals to the oscillator means as a new frequency of the sampling clock signals.

5. A method of transmitting video signals accompanied by horizontal and vertical synchronization signals using modulation, comprising the steps of:
    sampling incoming video signals;
    providing sampling clock signals;
    modulating sampled video signals at timings given by the sampling clock signals;
    controlling the phase relationship between the horizontal synchronization signal and the sampling clock signals; and
    transmitting the modulated video signals.

6. The method of claim 5, wherein at the controlling step the phase relationship between the horizontal synchronization signal and the sampling clock signals is controlled such that the phase relationship will be alternated with a completely opposite one differing by 180° successively.

7. The method of claim 6, wherein the controlling step further comprises the steps of:
    controllably providing a sampling phase to be utilized at the sampling step by comparing phases of the horizontal synchronization signal and the sampling clock signals; and
    controlling the frequency of the sampling clock signals by comparing frequencies of the horizontal synchronization signal and the sampling clock signals.

8. The method of claim 7, wherein the frequency controlling step includes the steps of:
    counting the sampling clock signals, with resetting to a prescribed initial value and producing result of counting when one horizontal synchronization signal is given;
    holding the result of counting produced at the counting step; and
    converting the result of counting held at the holding step into analog signals, and utilizing the analog signals as new frequency of the sampling clock signals.

* * * * *